INVENTOR
Leo Storch
BY Charles H. Brown
ATTORNEY

Nov. 22, 1955 L. STORCH 2,724,804

TRANSMISSION COUPLING SYSTEM

Filed July 24, 1951 2 Sheets-Sheet 2

INVENTOR
Leo Storch
BY
Charles H. Brown
ATTORNEY

United States Patent Office 2,724,804

Patented Nov. 22, 1955

2,724,804

TRANSMISSION COUPLING SYSTEM

Leo Storch, Los Angeles, Calif., assignor to Radio Corporation of America, a corporation of Delaware Application July 24, 1951, Serial No. 238,253

4 Claims. (Cl. 333—17)

My invention relates to a transmission coupling system and more particularly to a novel coupling arrangement in which the impedances of the transmission system between the load device and the source of power may be properly matched throughout the system.

In coupling power from a source to a load over a transmission line, it is necessary for optimum operation that the impedances of the elements be properly matched. This is customarily accomplished by placing an impedance matching network between the source of power and the input end of the transmission line and a second impedance matching network between the output end of the transmission line and the load. The matching networks may be then adjusted to provide the desired impedance match.

Where such systems are used for supplying alternating current power at a fixed frequency, the networks may be initially adjusted and then left untouched. However, since impedance is dependent upon frequency, sources of alternating current power which are designed for operation at variable frequencies require an adjustment of the matching networks with every change in frequency.

As an example of the latter type system, such a change is necessitated in radio transmitters designed for operation on several frequency bands. Here, a change in the transmitter carrier frequency necessitates a change in matching impedances. Where the load is located at a distance from the source of power, as would be the case in an antenna supplied with power from a remotely located radio transmitter, the problem of adjusting the desired impedances becomes more complicated and usually necessitates some type of remote control apparatus.

Since the change in antenna impedance as a function of frequency may be very steep and many frequency channels may be involved, only rough pre-setting of the tuning elements is possible, and final tuning requires scanning by continuously variable elements. Furthermore, since resonance is obtained by reactive circuits, even a small amount of detuning is sufficient to reduce the available antenna power seriously.

Accordingly, it is an object of my invention to provide a novel method of and apparatus for adjusting the impedances of a transmission system.

It is a further object of my invention to provide a novel method of and apparatus for adjusting the impedance of a transmission system which will require a minimum amount of associated apparatus.

Still another object of the invention is to provide a novel method of and means for automatically matching the impedances of a transmission system.

Briefly, the transmission system of the invention includes a source of power (for example, a radio transmitter) coupled to a useful load through a transmission line, a power matching network having variable parameters connected between the source and one end of the transmission line, a load coupling network having variable parameters connected between the load and the other end of the transmission line, and a switching means for disconnecting the input end of the transmission line from the system and substituting therefor a dummy load which consists of a resistance equal in value to the characteristic impedance of the radio frequency transmission line. In accordance with the invention, with the dummy load connected, the parameters are adjusted until the source is properly matched to the dummy load.

When the desired conditions of current and phase, indicating a matched condition, are obtained at the input to the power matching network, the dummy load is disconnected and the transmission line, a load coupling network, and the useful load is substituted therefor. The variable parameters of the load coupling network are then adjusted to give the same desired conditions of current and phase at the input of the power matching network. The phase is adjusted in both matching operations under the control of a single phase discriminator which compares the phase of a reference driving voltage with the phase of the voltage across the input terminals of the power matching network. The current is adjusted in both matching operations under the control of a single current comparator which compares a direct current component of the power source with a reference value.

These operations may be made automatic by means of motor drives which vary the parameters of the power coupling network until the desired phase and current relationship are reached, at which time the motor drives for the power coupling network are disengaged. The transmission line, load coupling network, and the load are then connected automatically in place of the dummy load, and a second motor drive is energized which varies the parameters of the load coupling network until the same conditions of current and phase are achieved at the input to the power matching network. At this point the entire system, including both of the networks, the transmission line and the load, is matched to the power source.

The above and other objects and advantages of my invention will become apparent upon a consideration of the following detailed description of the invention taken in conjunction with the accompanying drawings in which.

Figure 1:
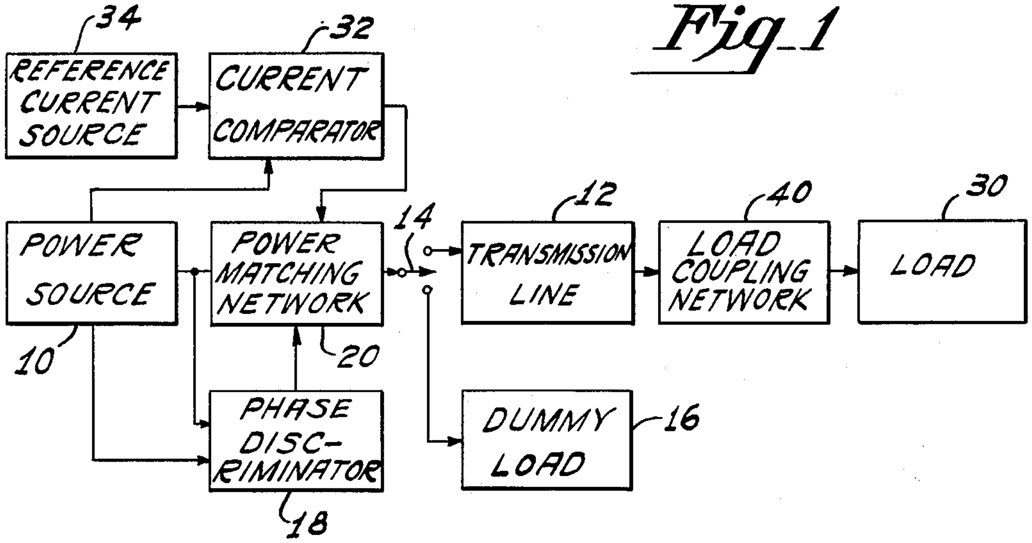
Fig. 1 represents in block diagram an embodiment of the invention.

The principles of operation of my invention will be explained with reference to Fig. 1. In that figure there is represented by the block 10 a source of alternating current power. This source may be of any suitable type (for example, a radio transmitter) and may deliver power at any one of a multiplicity of frequencies. Power from the source is coupled to the transmission line represented by a block 12 by means of a power matching network represented by the block 20 and one set of terminals of a switching device 14. The power matching network is of the type which is provided with variable impedances whereby the impedance of the power source 10 may be matched to the impedance of the transmission line. The output from the transmission line is coupled to the load, represented by the block 30 by means of a load coupling network represented by the block 40. The load coupling network is also provided with variable impedances whereby the parameters of the load coupling network may be adjusted so that the impedance of the load matches the impedance of the transmission line.

The switching device 14 makes it possible to transfer the power output from the input side of the transmission line 12 to a dummy load, represented by the block 16. The switch 14 has a normal position completing a transmission path from the power source 10 (which may be a radio transmitter), thru the power matching network 20, thru the transmission line 12 and thru the load coupling network 40 to the load 30 (which may be an antenna). Switch 14 has an alternate position for directing energy from the transmission path to the dummy load 16. The dummy load is made to have a resistive impedance equal to the characteristic impedance of the transmission line.

There is also provided a phase discriminator, represented by the block 18 which receives energy from the input of the power matching network and compares its phase with that of a reference driving voltage.

In addition, there is provided a current comparator, represented by the block 32. This device contains means for comparing the magnitude of the current in the power output from the power source with respect to a reference current source represented by the block 34. A specific form of current comparator is described in connection with Fig. 2 infra.

In the operation of the system of Fig. 1, the switching device 14 is actuated to a position which couples the output from the power matching network 20 to the dummy load 16. The variable impedances of the power matching network are then adjusted until the desired output current is obtained and the power matching network presents a solely resistive load to the power source 10. Stated otherwise, the impedances are adjusted to give a unity power factor load to the source by comparing the phase of the input to the power matching network 20 to a reference driving voltage. When zero phase shift occurs, the power factor of the matching network 20 and dummy load 16 is unity. The impedance of the power source 10 will be perfectly matched. It follows, since the resistance of the dummy load 16 is equal to the characteristic impedance of the transmission line 12, that the power matching network 20 is adjusted for optimum transfer of power from the power source 10 to the transmission line 12.

This much of the operation of my invention is standard practice, particularly in the radio art, and is not believed to require further elucidation. For those who are interested in a more complete discussion of methods of matching the impedance of a power source to a load, reference may be had to any standard textbook on network and circuit theory or the radio amateur's handbook.

When both the desired current and phase are attained simultaneously, the switching device 14 is actuated to disconnect the dummy load 16 from the output of the power matching network 20 and substitute therefor the input of the transmission line 12.

On the occurrence of the last noted operation of the switching device 14, there exists the possibility that the setting of the variable impedances of the load coupling network 40 are such that the impedance of the load 30 does not match the image impedance of the transmission line 12. As a result, the current and phase relationship which were achieved when the dummy load 16 was connected in the circuit will be upset. In accordance with the invention, use is made of the current comparator 32 and the phase discriminator 18 to determine the proper adjustment of the variable impedance of load coupling network 40, so that the impedance of the load 30 will be properly matched to the impedance of the transmission line 12.

To accomplish this purpose, the variable impedances of the load coupling network 40 are adjusted, without changing the settings of the variable impedances of the power matching network until, as indicated by the current comparator 32 and the phase discriminator 18, the predetermined current and phase relationship are obtained. At this point, an impedance match exists throughout the network assembly from power source 10 to load 30.

Figure 2:
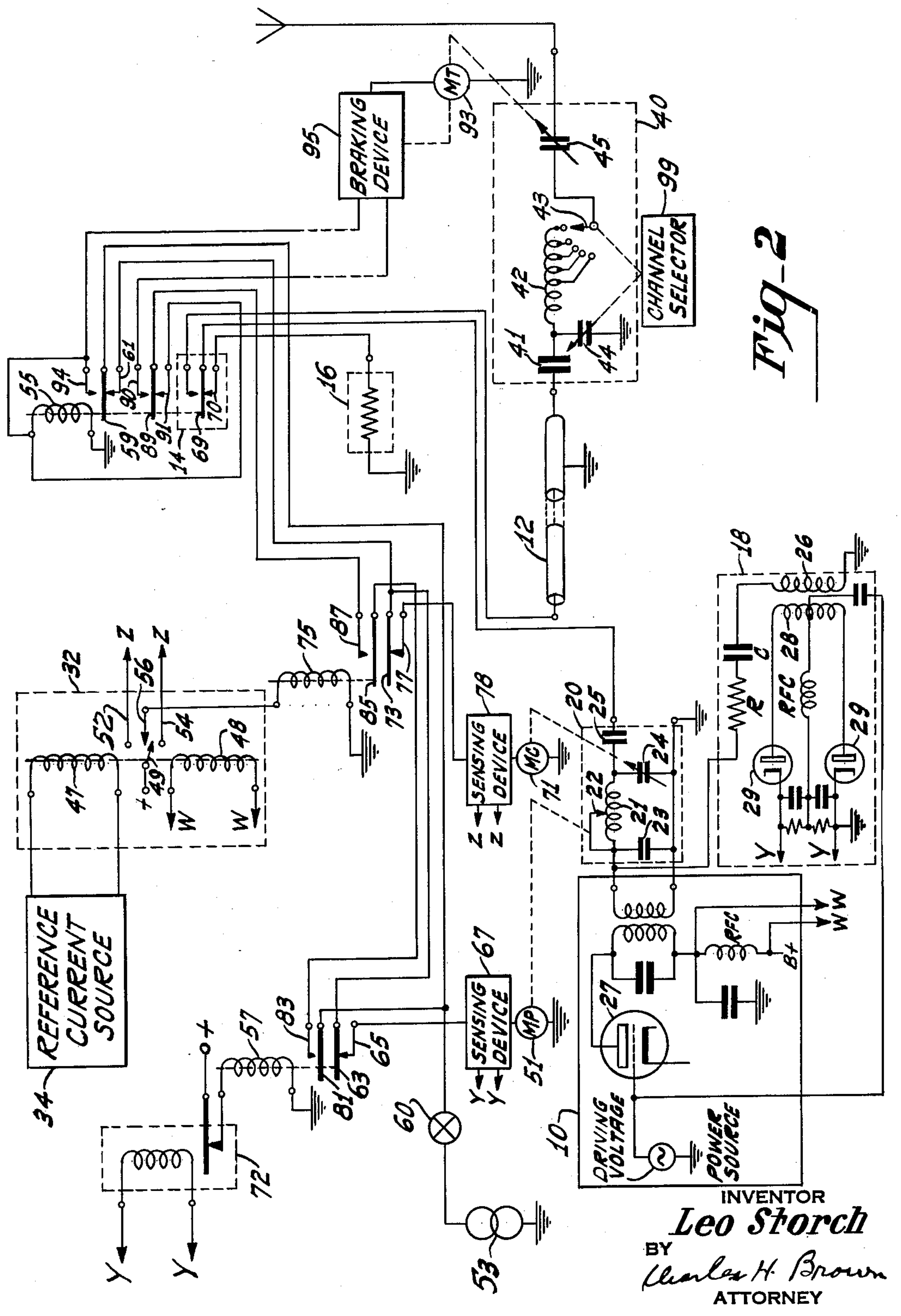
Fig. 2 represents schematically some of the details of the invention.

It is possible to accomplish the above operations automatically. Referring to Fig. 2, there is shown, by way of example, one means of automatically matching the impedances between the output of a multiband transmitter and an antenna. In this figure, dotted lines have been placed around the elements represented by the blocks shown in Fig. 1, and given corresponding numbers.

Thus, within the dotted line 20, there is shown a power matching network including a series connected variable inductance 21 provided with a shorting tap 22. The inductance is shunted to ground at the input end by a fixed capacitor 23 and at its output end by a variable capacitor 24. The ungrounded output is taken off from a fixed condenser 25 in series with the output of the variable inductance.

The load coupling network, shown within the dotted lines 40, includes a fixed condenser 41, a tapped inductance 42, a tap switch arm 43, and a variable capacitor 45 connected in series in the order named and a shunt condenser or bank of condensers 44 connected between the junction of the condenser 41 and the inductance 42 and ground.

The load 30 is represented as an antenna and the dummy load 16 as a resistor. The switch 14 is shown as being included in the contacts of an output relay 55. The phase discriminator 18 is of standard construction and its operation well known to those skilled in the art. One of the voltages to be compared is coupled to the midpoint of the inductance 28 and is applied to both halves of the full wave rectifier circuit 29 in phase. In the particular embodiment shown, this first voltage is the reference voltage and is derived from the driving voltage of a power amplifier 27. The other voltage is derived from the input to the power matching network 20 and is coupled through a high series resistance R to limit the current drawn from the output and to bring the current and voltage nearly in phase, and if desired, through a series capacitor C, to the inductance 26. This connection establishes a 90° phase difference between the voltages in the inductance 28 driving the full wave rectifier 29 to properly operate the phase discriminator 18 in the usual manner. When the two voltages fed to the phase discriminator 18 are in phase, no direct current output will appear across the terminals *y–y*. If the two voltages, however, are out of phase, a direct current voltage proportional to their difference in phase appears across the terminals *y–y*.

The current comparator 32 includes the balanced relay having a reference current winding 47 and a power current winding 48. The switch arm 49 is arranged to supply power to either its upper terminal 52 or its lower terminal 54 in accordance with whether the reference current is respectively greater or less than the power current. When the currents are equal, power is supplied to its center terminal 56. The power current supplied to the power current winding 48 at the terminals *w–w* may be obtained from the direct current component of a power amplifier 27 by tapping across a radio frequency choke in the direct current circuit in the manner shown in block 10 of Fig. 2.

It is to be understood that the above elements are represented by way of example only and the invention is not to be limited to the precise circuitry shown.

All relays have been shown in their de-energized position. It will be seen that in this position, the dummy load 16 is connected to the output of the power matching network 20 through the lower switch arm 69 and the lower terminal 70 of the output relay 55. It will also be noted that the transmission line 12 is disconnected from the system.

The shorting tap 22 of the variable inductance 21 of the power matching network 20 is driven by drive means 51, labeled MP. The drive means 51 receives power from a source 53 through the contacts of the ouput relay 55 and the phase relay 57. This circuit may be traced as follows: From source 53, through a switch 60, the upper switch arm 59 of the output relay 55, the lower terminal 61 of the output relay 55, the lower switch arm 63 of the phase relay 57, the lower terminal 65 of the phase relay, and through a sensing device 67 to the drive means 51.

The phase relay 57 is operated under the control of the phase discriminator 18 and is automatically actuated by means of a non-polarized relay 72 which is energized by the output of the phase discriminator 18 when the output of the discriminator shows other than zero phase shift between the reference driving voltage and the input to the power matching network 20. For the purpose of simplifying the drawing the connection between the phase discriminator and the non-polarized relay have not been shown but have been indicated by the terminals *y–y* on the non-polarized relay and the corresponding terminals *y–y* of the phase discriminator. When energized, the non-polarized relay 72 opens the circuit supplying current to the phase relay 57.

As an added refinement, there has been included the sensing device represented by the block 67. This device acts under the control of the phase discriminator to control the direction in which the drive means 51 moves the shorting tap of the variable inductance 21, in accordance with whether the phase of the power output of the power matching network leads or lags the phase of the power input to the network. Here, too, the control leads from the phase discriminator to the sensing device 67 have not been shown but are represented by the correspondingly marked terminals *y–y* on the sensing device and the discriminator. Such sensing devices are old in the art and merely reverse the direction of the drive in accordance with the sense of the control voltages. By making the drive means cyclic, that is to vary the impedance over its full range each cycle, the need for the sensing device 67 and the other sensing devices described later, will be obviated.

From the above, it will be seen that the phase relay 57 is energized only when the desired phase relationship exists and when energized disables the drive means 51 by means of its lower switch arm 63.

While the current delivered by the power source 10 depends upon the variable inductor 21 as well as the variable capacitor 24, it is controlled by utilizing only the variable condenser 24. This condenser is driven by a drive means, 71, labeled MC. Power for operating the drive means, 71, is derived from the source, 53, by a circuit which may be traced as follows: The source 53, the switch 60, the upper switch arm 59 of the output relay 55, the lower switch arm 73 of the current relay 75, the lower terminal 77 of the current relay, and through a sensing device 78 to the drive means 71.

The current relay 75 is actuated under the control of the current comparator 32. This comparator compares the direct current component in the output of the power source 10 with a fixed reference current and energizes the current relay 75 whenever they are equal. The connections between the power source and the current comparator have not been shown but are indicated by the correspondingly marked terminals *w–w*.

The sensing device 78 operates under the control of the current comparator 32 to control the direction in which the drive means 71 drives the condenser 24 in accordance with whether the output current is greater than or less than the reference current.

From the above, it will be seen that the current relay 75 is energized only when the output current is at a predetermined value, and when energized disables the drive means 71 by means of its lower switch arm 73.

Furthermore, it will be seen that should the variation of the current setting variable condenser 24 upset the phase relationship, the phase relay 57 will become de-energized and cause the drive means 51 to move the shorting tap 22 to re-establish the desired phase relationship. Similarly, should the movement of the shorting tap 22 upset the current balance, the current relay 75 will become de-energized and the drive means 71 will adjust the variable condenser 24 to re-establish the desired current relationship. These two operations continue until the desired phase and current relationship are obtained simultaneously.

Upon the simultaneous actuation of the phase relay 57 and the current rlay 75, the output relay 55 is energized over a circuit which may be traced as follows: The driving power source 53, the switch 60, the upper switch arm 81, and the upper terminal 83 of the phase relay 57, the upper switch arm 85, and the upper terminal 87 of the current relay 75, the center switch arm 89, and its lower terminal 91 of the output relay 55.

Upon energization, the output relay 55 locks up into position by means of a circuit which may be traced as follows: The power source 53, through the switch 60, the upper switch arm 59 and its upper terminal 94 of the output relay 55.

In its energized condition, the lower switch arm 69 of the output relay 55 disconnects the dummy load 16 from the output of the power matching network 20 and substitutes therefor the input of the transmission line 12. It will be noted that the transmission line 12 has been shown to be of the concentric line type. It is to be understood that this is by way of example only since any suitable power transferring transmission line can be used without departing from the spirit of the invention.

At the same time, the upper switch arm 59 of the output relay 55 breaks the power circuit to the drive devices 51 and 71, so that the setting of the variable inductance and the variable capacitance of the power matching network 20 can not be changed even though the newly substituted load should upset the predetermined phase and current relationship and thereby de-energize either or both the phase relay 57 or the current relay 75.

Also, at the same time, the center switch arm 89 of the output relay connects driving power to the drive means 93, labeled MT, through its upper terminal 94 and a braking device 95.

The drive means 93 adjusts the variable capacitor 45 of the load coupling network to a setting such that the predetermined phase and current relationship are established at the input of the power matching network. This adjustment is made under the control of the current compartor 32 and the phase discriminator 18 by means of a circuit from the source of driving power 53, including the upper switch arm 81 of the phase relay, its associated terminal 83, the upper switch arm 85 of the current relay 75, its associated terminal 87, the center switch arm 89 of the output relay 55, and its associated terminal 90. When the correct phase and current relationship are simultaneously re-established, operating power from the source 53, will be transmitted to the braking device 95 over the circuit just recited. Energization of the braking device 95 disables the drive means 93. This disablement may take the form of de-energizing the drive means 93 and applying a brake to the drive means 93 or may merely de-energize the drive means 93.

It will be noted that each time a new channel is selected, the channel selector 99 sets the shunt condenser 44 and the tap on the inductor 42 of the load coupling network to values such that within the range of variation of the series condenser 45, a correct match can be obtained. As soon as the output relay 55 operates, the drive means 93 rotates the condenser 45. This rotation continues until a position is reached which corresponds to a proper match to the transmission line 12. At this moment, the outputs of the phase-discriminator 18 as well as the current comparator 32 return to their predetermined values and relays 57 and 75 respectively are simultaneously operated. This operation energizes the braking device 95 to leave the system in a condition of correct impedance match throughout.

The switch 60 is opened each time the power source 10 is shifted to operate at a new frequency. The opening of this switch de-energizes the output relay 55 and the system is returned to a position of rest with the dummy load connected in the circuit and the transmission line disconnected. The above operations are then repeated until the impedances of the system are balanced at the new frequency.

In order to minimize the amount of adjustment required at the load coupling network, the bandswitching operation may also include the automatic selection of the proper tap on the inductance 42. This arrangement is indicated by the block 99. At the same time, a new fixed capacitance may be substituted for the fixed capacitance 23 in the power matching network 20 to tune the power matching network to resonance at the new frequency.

Figure 3:
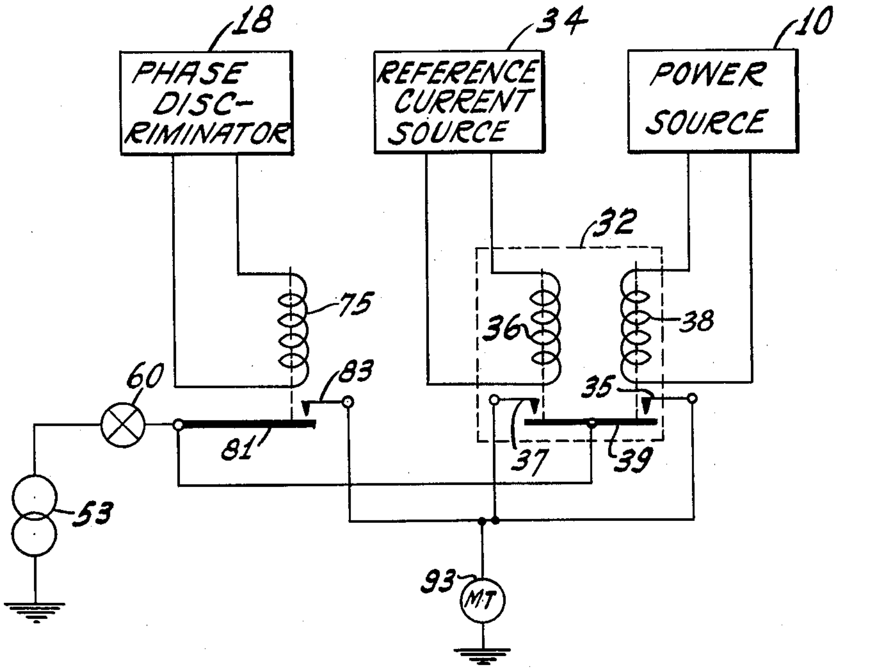
Fig. 3 represents schematically a modification of the switching arrangement shown in Fig. 2.

In Fig. 3 there is illustrated a modification of the arrangement shown in Fig. 2 for actuating the drive means 93 which adjusts the variable capacitance 45 of the load coupling network 40 of Fig. 2. Only so much of the relay circuits have been shown as will make clear the operation of this modification.

Referring to Fig. 3, the power source 53 for the drive means is connected to the upper switch arm 81 of the phase relay 75. The phase relay 75 is energized under the control of the phase discriminator 18. However, in this modification, the output of the discriminator is arranged to de-energize the phase relay when the desired phase relationship is attained. Thus the drive means 93 will receive operating power through the upper terminal 83 of the phase relay 75 at all times when the phase relationships are other than desired. When the desired phase relationships exist, the phase relay 75 is de-energized and the drive means 93 cannot be energized through its relay contacts.

Within the dotted lines 32, there is shown one form of current comparator. Here, the reference current flows through one winding 36 of a balanced relay. Current from the power source 10 flows through the other winding 38 of the balanced relay. The armature 39 of the balanced relay is tilted in one direction or the other in accordance with the relative current strength in the two windings 36, 38. Thus, if the reference current is the stronger, the armature will be tilted so as to contact the left terminal 37 of the balanced relay and if the reference current is the weaker the armature will be tilted so as to contact the right terminal 35 of the balanced relay.

It will be noted that the drive power source 53 is also connected to the armature 39 of the balanced relay. Since the left and right terminals of the balanced relay are connected together, the drive means 93 will be energized whenever the desired power current is either less than or greater than the reference current.

From the above, it will be clear that the drive means 93 will be energized until a time when the desired current and phase relationship are attained. At this time the phase relay 75 will be de-energized and the balanced relay will be in its neutral position. Thus all circuits supplying power to the drive means 93 will be open and the variable condenser of the load coupling network will remain in the position which assures the predetermined relationship.

When using the embodiment shown in Fig. 3, certain other modifications of the relay circuits of Fig. 2 will be necessitated. It is believed that these changes will be clear to one skilled in the art.

I claim:

1. A transmission system comprising in combination a source of power, a power matching network, a transmission line, a load coupling network and a load, all connected in series in the order named, said networks each including a variable inductance and a variable capacitance, a phase discriminator connected to compare the phase of the voltage at the input terminals of said power matching network with the phase of a reference voltage in said source, a current comparator connected to compare a direct current component in said source with a reference direct current, a dummy load having a predetermined impedance, switch means actuated by the outputs of said discriminator and said comparator for disconnecting said transmission line from said power matching network and substituting therefor said dummy load, drive means operated under the control of said phase discriminator for adjusting the variable inductance of said power matching network whereby a predetermined relationship between the phase of said source and the phase in said power matching network is obtained, drive means operated under the control of said current comparator for adjusting the variable capacitance of said power matching network whereby a predetermined current is established in said power matching network, means operating said switch means when said predetermined phase and current relationship occur simultaneously for disconnecting said dummy load and substituting said transmission line therefor and disabling said inductance and capacitance drive means, drive means for varying the variable capacitance of said coupling network, said last mentioned drive means being operated under the control of said discriminator and comparator whereby the capacitance of said coupling network is adjusted to have a value such that said predetermined phase and current relationship appear in said power matching network.

2. In a transmission system for coupling a source of power to a useful load, the combination of a power matching network having variable parameters coupled to said source, switching means connected to said power matching network and having alternate contacting positions, a transmission line having a characteristic impedance, one end of said transmission line being connected to the second of said alternate positions of said switch, a dummy load having a resistance equal to said characteristic impedance connected to the first of said alternate positions of said switch, a load coupling network having variable parameters connected to the other end of said transmission line, said useful load being coupled to said last network, a phase discriminator connected to compare the phase of a reference voltage in said source with the input voltage of said power matching network, a current comparator connected to compare a reference current with a component of current in said source, means operated under the control of said phase discriminator and said current comparator to vary the parameters of said power matching network when said switch is in said first alternate position, means to actuate said switch to the second alternate position when the phase of said voltages is zero and said currents are equal, and remote means operated under the control of said phase discriminator and said current comparator to vary the parameters of said load coupling network when said switch is in said second alternate position.

3. In a transmission system for coupling a source of power to a useful load, the combination of a power matching network having variable parameters coupled to said source, switching means connected to said power matching network and having alternate contacting positions, a dummy load connected to the first of said alternate positions of said switch, a load coupling network having variable parameters, a transmission line connected from said load coupling network to the second of said alternate positions of said switch, said useful load being coupled to said last network, a phase discriminator connected to compare the phase of a reference voltage in said source with the input voltage of said power matching network, a current comparator connected to compare a reference current with a component of current in said source, means operated under the control of said phase discriminator and said current comparator to vary the parameters of said power matching network when said switch is in said first alternate position, means to actuate said switch to the second alternate position when the phase of said voltages is zero and said currents are equal and to remove the control of said phase discriminator and said current comparator from said means to vary the parameters of said power matching network, and remote means operated under the control of said phase discriminator and said current comparator to vary the parameters of said load coupling network when said switch is in said second alternate position and thereby reëstablish the voltage phase and equal current condition obtained in the first alternate position of said switch.

4. A transmission system comprising; a transmission path including in the order named, a radio transmitter, a power matching network having variable parameters, a transmission line, a load coupling network having variable parameters and an antenna; a dummy load having the same impedance as the characteristic impedance of said transmission line; a two-position switch interposed in said transmission path at said transmission line and having a normal position completing said transmission path, and having an alternate position breaking said path and connecting energy from said path to said dummy load; a phase discriminator connected to compare the phase of a reference voltage in said transmitter with the input voltage of said power matching network, a current comparator connected to compare a reference current with a component of current in said transmitter, means operated under the control of said phase discriminator and said current comparator to vary the parameters of said power matching network when said switch is in said alternate position, means to actuate said switch to the normal position when the phase of said voltages is zero and said currents are equal and to remove the control of said phase discriminator and said current comparator from said means to vary the parameters of said power matching network, and remote means operated under the control of said phase discriminator and said current comparator to vary the parameters of said load coupling network when said switch is in said normal position and thereby reestablish the voltage phase and equal current condition obtained in the alternate position of said switch.

References Cited in the file of this patent

UNITED STATES PATENTS

| | | |
|---|---|---|
| 2,456,800 | Taylor et al. | Dec. 21, 1948 |
| 2,502,396 | Vogel | Mar. 28, 1950 |
| 2,505,511 | Vogel | Apr. 25, 1950 |
| 2,523,791 | Vahle | Sept. 26, 1950 |
| 2,524,183 | Wheeler | Oct. 3, 1950 |